Sept. 17, 1946.   M. B. MORGAN   2,407,675
VEHICLE DRIVE AXLE GEARING
Filed Sept. 8, 1942   2 Sheets-Sheet 1

Inventor
Mathew B. Morgan
By Strauch & Hoffman
Attorneys

Sept. 17, 1946.    M. B. MORGAN    2,407,675
VEHICLE DRIVE AXLE GEARING
Filed Sept. 8, 1942    2 Sheets-Sheet 2

Inventor
Mathew B. Morgan
Strauch & Hoffman
Attorney

Patented Sept. 17, 1946

2,407,675

UNITED STATES PATENT OFFICE 2,407,675

VEHICLE DRIVE AXLE GEARING

Mathew B. Morgan, Detroit, Mich., assignor to The Timken-Detroit Axle Company, Detroit, Mich., a corporation of Ohio Application September 8, 1942, Serial No. 457,654

3 Claims. (Cl. 74—326)

This invention relates to automotive vehicles and is more particularly concerned with such vehicles having front and rear drive axles.

Heavy duty automotive vehicles wherein the engine is connected to drive both front and rear axles have recently been developed widely especially in view of increasing military use. Most of these vehicles embody transfer case mechanisms wherein the propeller shaft from the engine is drive-connected to the front and rear drive axles. Such transfer cases usually contain a large number of gears and bearings which make them relatively expensive and add considerably to the cost of a vehicle thus equipped.

My present invention provides simple, inexpensive drive arrangements between the engine-driven propeller shaft and the front and rear axles which eliminates the usual transfer case hitherto considered necessary in such constructions. The invention is especially applicable to heavy duty vehicles having low gear ratio drive and requiring double reduction axles at front and rear.

It is a major object of my invention to provide novel mechanism for driving the front and rear axles of an automotive vehicle.

It is a further object of the invention to provide novel drive mechanism for driving all the axles of a heavy duty automotive vehicle having more than two drive axles.

A further object of the invention is to provide a novel double reduction drive mechanism for driving the front and rear axles of a heavy duty automotive vehicle which eliminates the usual transfer case.

A further object of the invention is to provide novel variable speed double reduction drive mechanism for driving the front and rear axles of an automotive vehicle.

A further object of the invention is to provide a novel motor vehicle drive wherein an engine-driven propeller shaft is connected by variable speed reduction gearing to a drive shaft which in turn is connected by further reduction gearing to drive both the front and rear axles.

A further object of the invention is to provide an improved vehicle drive axle construction containing a novel change speed reduction gearing assembly.

A further important object of the invention is to provide a double reduction drive mechanism for driving at least two axles of a heavy duty vehicle in which the speed reduction gearing for both of the axles is disposed within the housing of one of them, which mechanism includes a countershaft extending between the two axles to drive them in synchronism.

Further objects of the invention will presently appear as the description proceeds in connection with the appended claims and the annexed drawings in which;

Figures 1, 2:
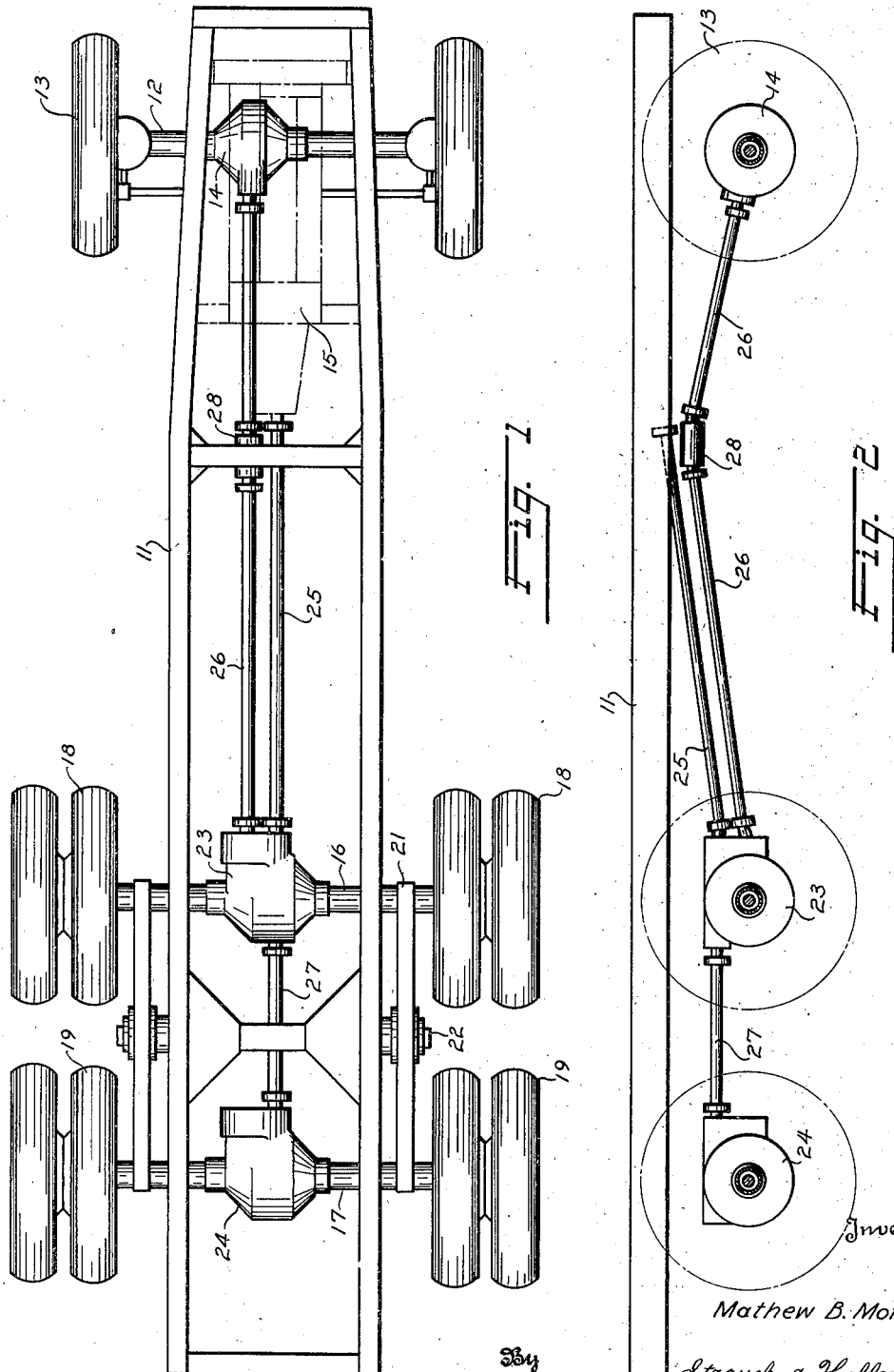
Figure 1 is a diagrammatic top plan view of a three axle vehicle embodying my novel front and rear axle drive arrangement.
Figure 2 is a side elevation of the vehicle of Figure 1.

Referring to Figure 1, a vehicle chassis 11 is supported at its forward end by a front drive axle 12 provided at opposite ends with the usual dirigible wheels 13 and formed intermediate its ends with a suitable differential housing 14. An internal combustion engine 15 of the usual type (shown in dotted lines in Figure 1) is mounted on the front end of frame 11.

The rear end of frame 11 is supported by spaced rear drive axles 16 and 17 which are supported at opposite ends by dual wheel sets 18 and 19, respectively. Axles 16 and 17 are interconnected by suitable springs 21 which in turn are pivotally connected to frame 11 at their mid points on trunnions 22. The suspension between axles 16 and 17 and frame 11 may comprise any suitable tandem axle suspension without departing from the spirit of the invention.

Figure 3:
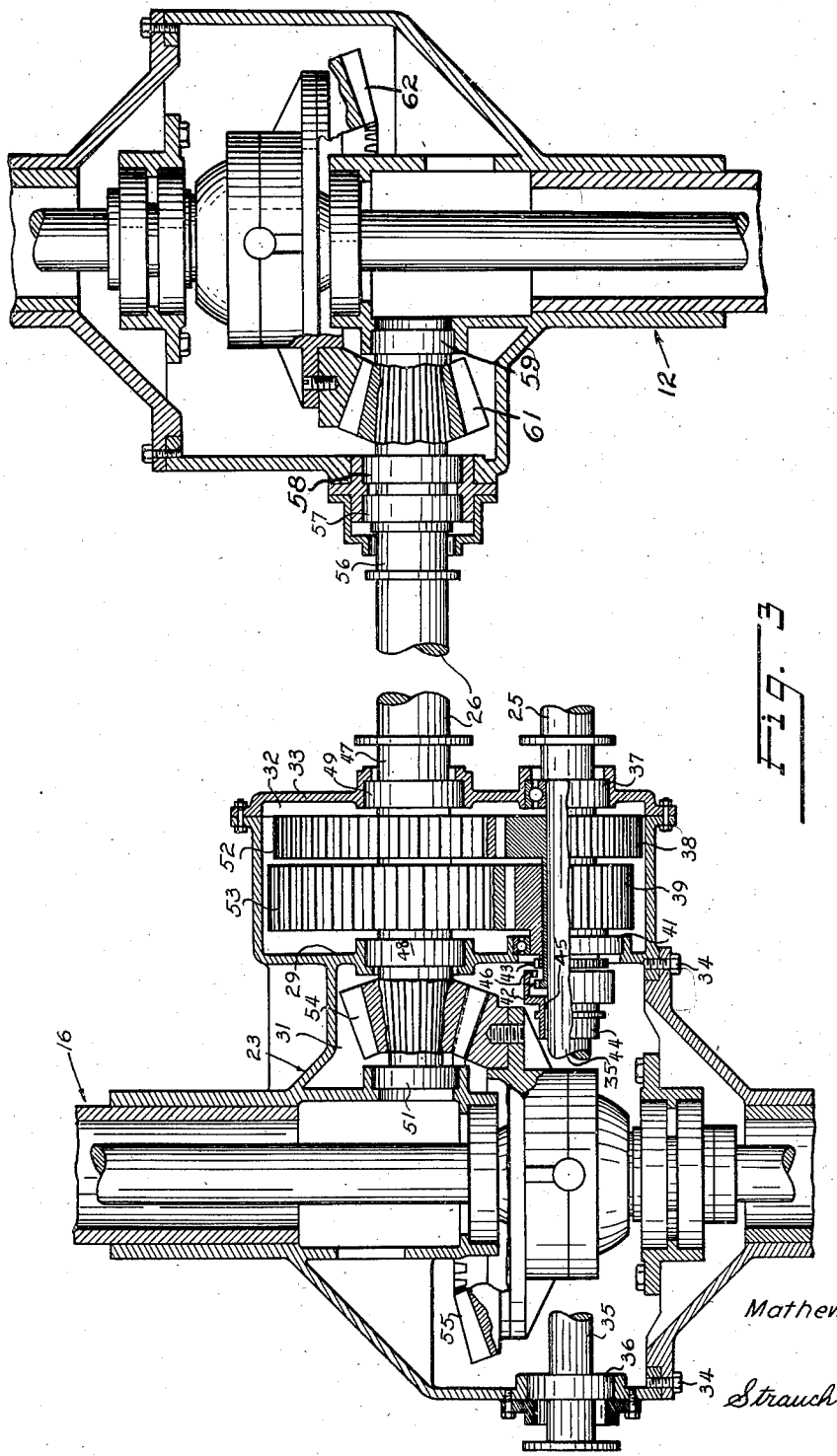
Figure 3 is a top plan view partly in section illustrating details of the change speed double reduction gearing for driving the front and the forward rear axles in the vehicle of Figures 1 and 2.

Axles 16 and 17 are formed with identical differential housing 23 and 24, one of which is illustrated in detail in Figure 3. An engine-driven propeller shaft 25 extends from engine 15 to the forward rear axle differential housing 23 where it is connected by suitable change speed double reduction gearing to a drive or transfer shaft 26 which drives axle 16 and extends forwardly from differential housing 23 to drive the differential within housing 14 on the front axle. Propeller shaft 25 (Figures 1 and 2) extends through differential housing 23 and is provided with an extension 27 leading to the rear differential housing 24 wherein it drives the rearmost axle through variable speed double reduction gearing similar to that within housing 23.

The invention may be applied to a two axle vehicle simply by eliminating axle 17 of Figures 1 and 2 and terminating the propeller shaft at axle 16.

In Figures 1 and 2 drive shaft 26 is shown as journalled intermediate its ends on a pillow block 28 on frame 11. This construction is employed only in relatively long wheel base vehicles, as in short wheel base vehicles drive shaft 26 may be a single shaft extending without intermediate support between axles 12 and 16. Figures 1 and 2 are diagrammatic showings, and it will be understood that in commercial embodiment of the invention suitable universal joints will be employed in the propeller and drive shafts wherever necessary.

Referring to Figure 3, differential housing 23 is preferably internally divided by a transverse wall 29 into a differential chamber 31 and a forward gear chamber 32, chamber 32 being disposed forwardly of the housing in the direction of the front axle. Front wall 33 of gear chamber 32 is removable, being bolted or similarly fastened to the housing. Housing 23 is longitudinally split at one side and the housing sections are removably fastened together as by bolts 34. This construction affords convenient access to the gearing within housing 23.

A propeller shaft section 35 extends longitudinally through housing 23 well above the differential gearing within chamber 31. Shaft section 35 is supported at opposite ends in suitable anti-friction bearings 36 and 37 in the rear wall of housing 23 and in wall 33, respectively. Shaft section 35 lies in the vertical plane containing propeller shaft 25 and extension 27, which plane preferably also contains the longitudinal centerline of the vehicle.

The opposite ends of shaft section 35 are flanged for convenient attachment to suitable universal joints (not shown) connecting it to shaft 25 and extension 27.

Within chamber 32, spur gears 38 and 39 of different diameter and number of teeth are independently rotatably mounted on shaft 35. Gear 38 is rotatably mounted directly on the shaft, and gear 39 is in turn rotatably mounted on the rearwardly extended hub of gear 38. The rearwardly extended hub of gear 39 is supported by an anti-friction bearing 41 in a suitable aperture in wall 29 thus providing an intermediate support for shaft section 35.

The telescoping hubs of gears 38 and 39 extend through apertured wall 29 into chamber 31 and are formed at their ends with spaced toothed clutch jaws 42 and 43, respectively.

Within chamber 31, a clutch collar 44 is slidably but non-rotatably mounted on shaft 35 as by spline 45, and clutch collar 44 is provided with a toothed clutch jaw 46 interposed between clutch jaws 42 and 43 of the spur gears. A suitable shifter mechanism actuated by a lever within the driver's compartment in the vehicle (not shown) is attached in a conventional manner for sliding clutch collar 44 back and forth to mesh clutch jaw 46 with either of jaws 42 or 43 to drive either of gears 38 or 39, respectively, from the shaft.

A rotatable drive shaft section 47 is supported intermediate its ends by an anti-friction bearing 48 in an aperture in wall 29 and is supported at opposite ends by suitable bearings 49 and 51 in front wall 33 and a stationary internal wall within housing 23. Within chamber 32 shaft 47 has non-rotatably secured thereto a pair of spur gears 52 and 53 constantly meshed with gears 38 and 39 on shaft 33.

Both gears 52 and 53 are of larger diameter than the gears 38 and 39 with which they are meshed, so that drive through either effects a reduction in the drive; that is, the shaft 47 may be driven at either of two lower speeds than the propeller shaft. Drive shaft section 47 is parallel to propeller shaft section 35 but is displaced laterally and downwardly therefrom to locate the axis of shaft 47 in the horizontal plane containing the axis of axle 16 and provide for plenty of road clearance between shafts 25 and 26 which rotate in opposite directions.

Within chamber 31 and between bearings 48 and 51, shaft 47 carries a relatively small hypoid bevel gear 54 which is meshed with the usual hypoid bevel gear 55 of the differential mechanism of the live axle shafting within axle 16. Since the differential mechanism and the remaining live axle construction within axle 16 may be of conventional construction, no further description thereof is necessary. Since gear 54 is substantially smaller than gear 55 this effects a second reduction in drive between the propeller shaft and the live axle.

At its front end shaft 47 extends through wall 33 and is flanged for attachment to a universal joint (not shown) on the rear end of drive shaft 26. The front end of shaft 26 is similarly universally attached to a flange on a stub shaft 56 supported at its rear end by spaced bearings 57 and 58 in an apertured boss extending rearwardly from housing 14. Stub shaft 56 is also located with its axis in the horizontal plane containing the axis of axle 12. Within housing 14, shaft 56 has its front end supported in a suitable bearing 59 on an internal wall of housing 14. Between bearings 58 and 59, shaft 56 has secured thereto a hypoid bevel gear 61 of the same size as gear 54. Gear 61 is meshed with a differential hypoid bevel gear 62 of the same size as differential gear 55 in rear axle 16. The remaining live axle construction within axle 12 is of conventional construction and preferably substantially the same as in axle 16.

Within differential housing 24, the live axle shafting of axle 17 is connected to propeller shaft extension 27 by a variable speed double reduction system of spur gears and hypoid bevel gears in the same manner as shown within housing 23 in Figure 3. The driver control for clutch collar 44 in housing 23 is connected to simultaneously actuate collar 44 in housing 24 so that both change speed mechanisms will be operated in unison to drive both rear axles at the same speed. The only difference is that the front end of drive shaft section 47 within housing 24 terminates and is covered by an end cap at bearing 49 and the rear end of propeller shaft section 35 within the housing 24 terminates and is covered by an end cap at bearing 36. Similarly in a two axle vehicle according to the invention, propeller shaft section 35 in housing 23 would be terminated and capped at bearing 36.

My invention provides a variable speed double reduction drive for both the front and rear axles of two or three axle vehicles without the employment of an expensive transfer case mechanism. In the usual transfer case design, when it is desired to provide a double reduction change drive at both front and rear axles, it is necessary to provide two sets of reduction gears at the front axle. The necessity for such is eliminated in my design since the change speed mechanism on housing 23 serves as the first reduction in the drive for both axles 12 and 16. Because of this I am able to use a smaller axle housing at the front drive axle.

Since the bevel gear drives at 54, 55 in axles 16 and 17 and 61, 62 in axle 12 comprise the second drive reduction, their drive ratio may be relatively high, approximately in the range of 3 or 3½ to 1 being preferred. In this patent the term "double reduction" relates to two drive reductions regardless of the drive ratio of those reductions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a drive axle, a motor driven propeller shaft section disposed substantially at right angles to said axle and extending forwardly and rearwardly thereof, axle drive mechanism including a drive shaft at one side of the axle in substantially parallel relation with one end of said propeller shaft section, housing structure for said axle drive mechanism supported on the axle and journalling the other end of said propeller shaft section at the opposite side of the axle, said housing structure having a lateral extension providing a gear chamber, in opposite side walls of which chamber said drive shaft and propeller shaft section are journalled, gearing within said chamber for transmitting power at reduced speed from said propeller shaft section to the drive shaft including change speed gears loosely mounted on said propeller shaft section, and a manually shiftable member keyed to said propeller shaft section within the housing to selectively connect said gears in driving relation with said propeller shaft section.

2. In a vehicle drive axle, a differential housing, a differential unit therein having a driving gear, a comparatively shallow gear chamber rigidly fixed to one side of said differential housing, a motor driven propeller shaft and a differential drive shaft mounted in opposite side walls of the gear chamber and positioned in relatively different vertical and horizontal planes with the axes of said shafts spaced from the radial plane of the differential driving gear at opposite sides thereof, a pinion on said drive shaft meshed with said differential driving gear, a pair of closely juxtaposed speed reducing gears fixed to said drive shaft within the gear chamber, a complementary pair of gears loosely mounted on the propeller shaft and in constant mesh with the respective speed reducing gears, and means constantly drive connected to said propeller shaft and located externally of said gear chamber for selectively establishing a driving connection between said complementary pair of gears and the propeller shaft.

3. The vehicle drive mechanism defined in claim 2, in which said gear selecting means includes a shiftable clutch member on the propeller shaft within the differential housing.

MATHEW B. MORGAN.